March 31, 1964 — G. SWIFT — 3,127,509
ELECTRICAL ANALOG DIP COMPUTER
Filed Jan. 13, 1960 — 2 Sheets-Sheet 1
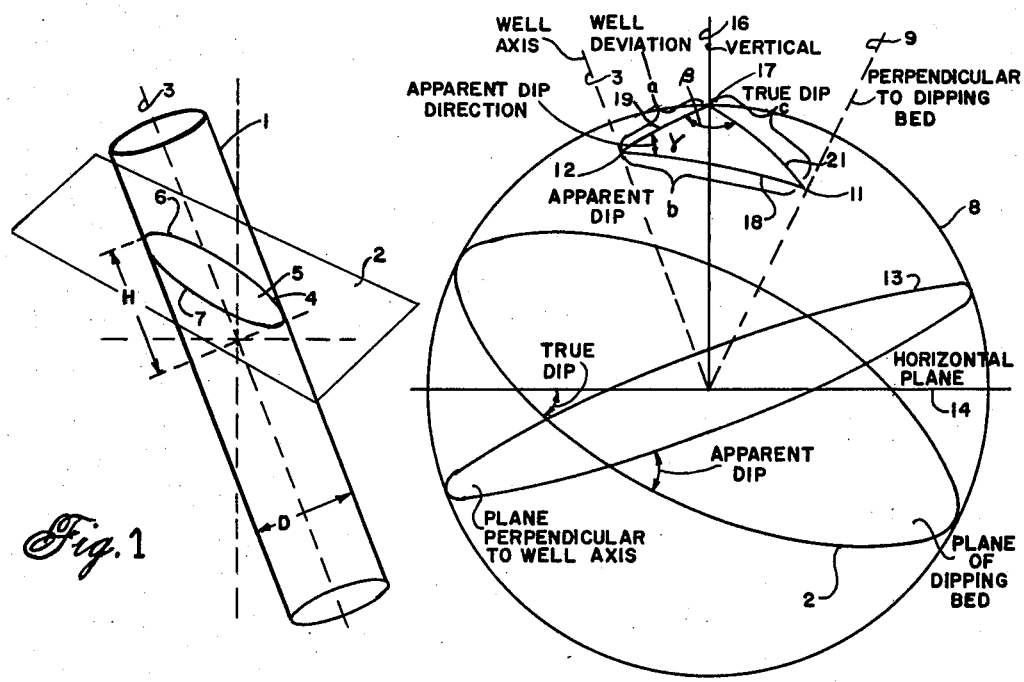
Fig. 1
Fig. 2
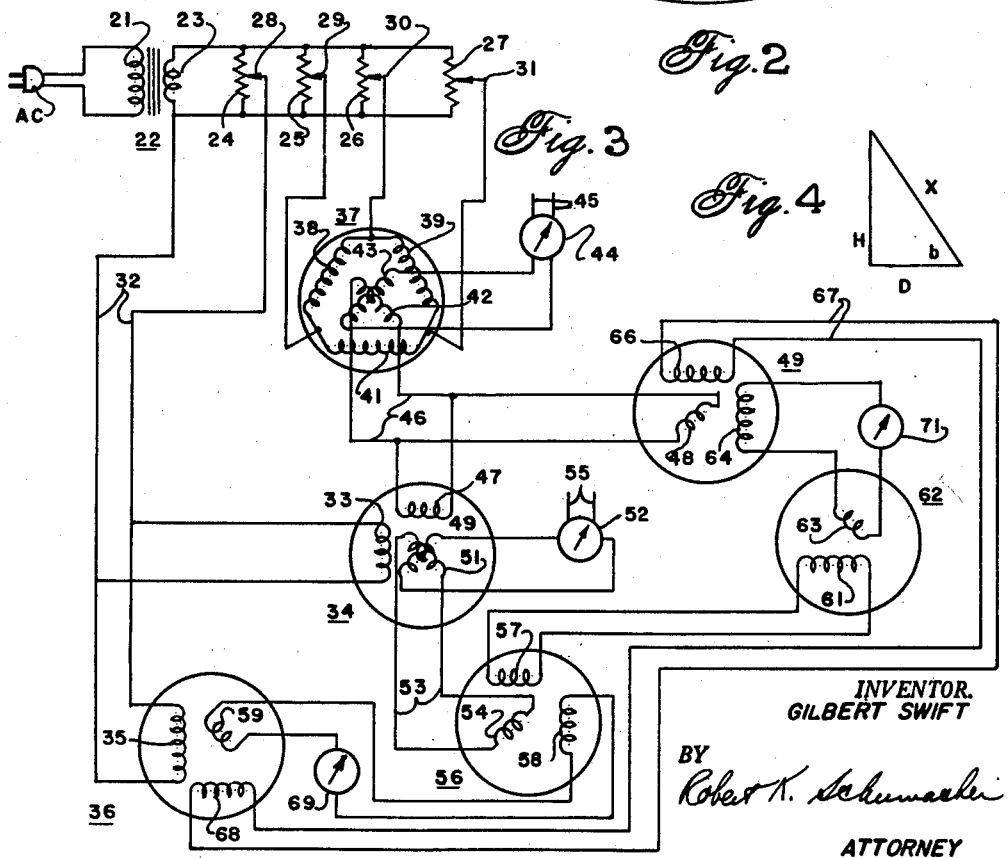
Fig. 3
Fig. 4
INVENTOR.
GILBERT SWIFT
BY Robert K. Schumacher
ATTORNEY

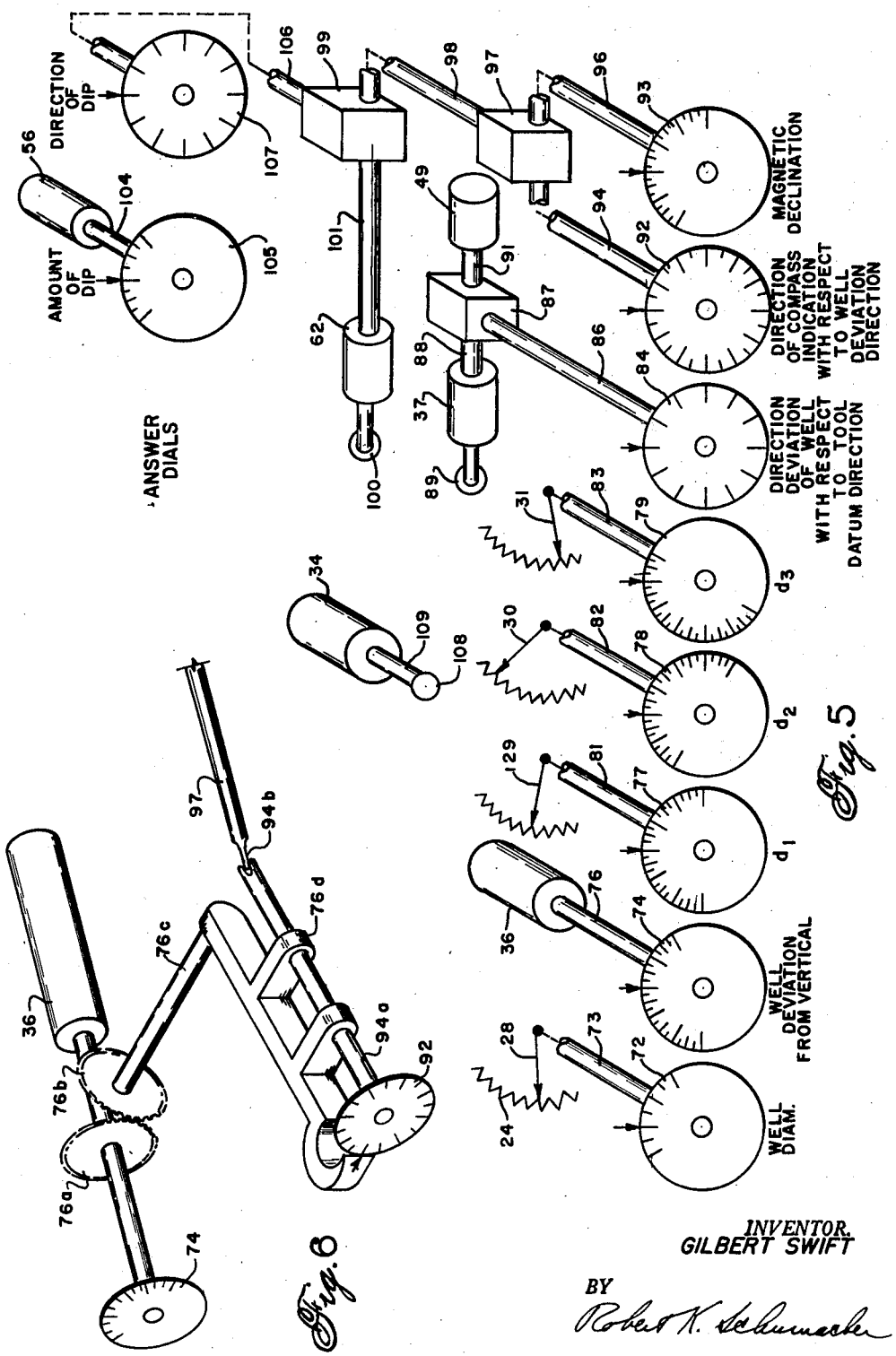

United States Patent Office 3,127,509
Patented Mar. 31, 1964

3,127,509
ELECTRICAL ANALOG DIP COMPUTER
Gilbert Swift, Tulsa, Okla., assignor, by mesne assignments, to Dresser Industries, Inc., Dallas, Tex., a corporation of Delaware
Filed Jan. 13, 1960, Ser. No. 2,186
4 Claims. (Cl. 235—188)

The present invention relates to computing apparatus and more particularly to a computer for solving a spherical triangle in order to determine the true dip and direction of true dip of the interface between two subsurface strata at the intersection of the interface and a well bore.

In the field of bore hole prospecting, much information can be gained concerning the probability of oil being located in a given region from a determination of the various types of subsurface strata intercepted by a well bore, the location of the various strata relative to one another, the angle of the various interfaces between the strata relative to the horizontal; that is, the true dip of the strata interfaces, and the direction of the true dip relative to magnetic or true north.

During a well logging operation, in order to locate the interfaces between various strata intercepted by the well, there is usually provided a well tool having three instruments spaced at 120° from one another about the periphery of the well tool which instruments determine various characteristics of the materials making up the well wall. Specifically, electrical resistance measurements may be made, the resistivity of the well formations varying with the type of formation, or well bore calipering operations may be conducted, the diameter of the well changing or varying with each particular strata. Simultaneous recordings of the parameters measured by these three instruments are made as a function of depth and from these recordings three locations of the changes of characteristics of the material surrounding well may readily be determined. These three locations determine a unique plane of intersection between the strata interface and the axis of the well bore and therefore define the apparent dip and direction with respect to a datum line on the instrument, of the apparent dip. The apparent dip is the angle of the plane of intersection between an interface and the well bore with respect to a plane perpendicular to the well axis while the direction of the apparent dip is the downward direction of the line of maximum apparent dip in the plane of intersection. During the course of the well logging operation, information in addition to that relating to the location of three points of intersection of an interface between strata and the well is also obtained and relates specifically to the angle of the deviation of the well axis from the vertical, the direction of such well deviation with respect to a datum line of the well tool, these being obtainable from a pendulum-like instrument, and the direction of the deviation from vertical relative to either true or magnetic north. The latter information is obtained by mounting a compass in the well tool and continuously recording its indications with respect to the direction of the aforesaid instrument. These latter three pieces of information may be correlated with the information relating to apparent dip and direction of apparent dip and by appropriate calculations, the true dip and direction of true dip of any particular interface may be obtained.

The difficulty with such procedure, however, is that the mathematical anlysis necessary is quite complicated and if accurate knowledge of the subsurface formations is to be obtained, it is necessary to employ spherical trigonometric equations. Plane trigonometry may be employed in those instances when the area of a triangle formed by sides proportional to well deviation, apparent dip and true dip is small. However, when the area of this triangle is large, and this occurs only when all of these quantities are large, the answers obtained by plane trigonometry are in error and may be quite misleading.

It is therefore an object of the present invention to provide a computer which resolves a spherical trigonometric problem to obtain, from values indicating apparent dip, direction of apparent dip, well deviation and the direction of well deviation, electrical quantities proportional to the true dip and direction of true dip of the interface between strata under investigation.

It is another object of the present invention to provide a computer which may employ information readily and directly obtainable from a well logging record, to compute the true dip and direction of true dip of the interface between strata intercepted by a well bore.

It is another object of the present invention to provide an analog dip computer which compensates for a directional error resulting from the fact that the compass in the well tool is always maintained in a horizontal position whereas the mechanism for reading the compass is secured to the well tool and therefore, at times is inclined with the well tool relative to the position of the compass in its horizontal plane.

It is yet another object of the present invention to provide a computer for resolving a spherical trigonometric problem in which raw data relating to the depth of the three points of intersection of an interface between strata and the well bore are applied directly to the computer along with information relating to the well diameter, well deviation from vertical, direction of well deviation from a datum line of a well tool employed to obtain the information, and the direction of well deviation with respect to north.

In accordance with the present invention, there is provided a computer employing electromechanical resolvers having stators and rotors, the latter being selectively positionable with respect to the former. All adjustments of the rotors of the resolvers are made until a null is indicated on an accompanying phase sensitive meter and since the meters are phase sensitive, all ambiguities attributable to phasing errors are eliminated from the apparatus. In order for information obtained from the well log to be applicable to the instrument directly without further external processing of the data, some mechanical linkages between input knobs and the rotors of the resolvers are employed where straightforward mechanical gearing is suitable to solve the particular problem. Specifically, in order to apply an indication of true north to the apparatus, the direction of the compass indication from the well log plus the magnetic declination are applied to the instrument through a differential gear. Similarly, in order to obtain the angle between the direction of apparent dip and the direction of well deviation, the direction of well deviation is applied as an input quantity while the direction of apparent dip is obtained as a by-product of the positioning of one of the rotors. The position of the rotor and the position of the input shaft are combined in another set of differential gears to provide a direct indication of the aforesaid angle which is thereafter applied to the rotor of a still further resolver. Still further, the solution of the spherical triangle by the computer of the present invention provides directly the angle of true dip of the strata but the direction of true dip derived by the computer is relative to the direction of well deviation and not true north. Here again, differential gearing mechanisms are employed to convert this angle to the desired angle, which is the direction of the true dip with respect to north.

It is, therefore, another object of the present invention to provide a computer employing electromechanical resolvers and plurality of mechanical interconnections between input dials and resolver rotors so that raw data obtained directly from a well log may be applied directly to the computer.

It is another object of the present invention to provide a computer for determining the true dip and direction of true dip of a strata intercepting a well bore, which computer employs electromechanical resolvers and phase sensitive null indicators for indicating the correct position of various of the rotors of these resolvers in order to eliminate all ambiguity from the apparatus.

The above and still further objects, features and advantages of the present invention will become apparent upon consideration of the following detailed description of one specific embodiment thereof, especially when taken in conjunction with the accompanying drawings, wherein:

FIGURE 1 is a schematic diagram of a generally vertical well bore which is intercepted by an interface between two strata;

FIGURE 2 is a spherical trigonometric diagram indicating the relationship between the various angles and sides of a spherical triangle and the various planes and axes of the well bore illustrated in FIGURE 1;

FIGURE 3 is a schematic wiring diagram of the resolvers and their interconnections which are employed to solve the spherical triangle of FIGURE 2;

FIGURE 4 is a simple plane trigonometric relationship employed to discuss the operation of one of the resolvers;

FIGURE 5 is a mechanical schematic diagram illustrating the mechanical interconnection between various input and output dials and various of the rotors of the electromechanical resolvers; and FIGURE 6 is a partial mechanical schematic diagram illustrating the mechanical interconnection between some of the shafts which are used to correct for an error in the compass reading of certain types of well tools.

Referring now specifically to FIGURE 1 of the accompanying drawings, there is illustrated a circular well bore 1 lying at a determinable angle with respect to the vertical and intercepted by a plane 2 constituting the interface between two subsurface strata. Since the well bore 1 is cylindrical and the plane 2 is chosen to intersect the central axis 3 of the well bore at an angle other than 90°, the points of intersection of the plane 2 and the well bore 1 define an ellipse 5 as illustrated in FIGURE 1. As previously indicated, by determining the depth below an arbitrarily chosen reference depth, of the three points of intersection such as 4, 6 and 7 between the plane 2 and the well bore 1, it is possible to determine the apparent dip of the plane 2; that is, its dip relative to a plane perpendicular to the axis 3 of the well bore 1. Further, it is possible to determine the direction of apparent dip of plane 2; that is, the direction of the major axis of the ellipse 5 which lies in plane 2 relative to a datum line of the instrument (one of the caliper arms usually) employed to determine the location of the points 4, 6 and 7. However, it is wished, in accordance with the present invention, to determine the true dip and direction of the true dip of the plane 2 and this information may be obtained if, in addition to the information relating to the points 4, 6 and 7, measurements are taken relating to the diameter of the well, the angular deviation of the well 1 with respect to the vertical, the direction of well deviation with respect to the datum line of the well tool, and the angle between the direction of well deviation and either magnetic or true north. The first measurement may be determined by a caliper, the second and third measurements by a pendulum and the fourth quantity may be determined by including a compass in the well tool and recording the direction of the needle of the compass relative to the aforesaid pendulum. With this additional information, calculations may be performed to obtain the desired quantities as indicated above and, in accordance with the present invention, there is provided a computer which may accept the information as set forth above and which can solve a spherical triangle from which may be derived two unknown quantities of the triangle, which are related to the true dip and the direction of the true dip of the plane 2 with respect to north.

Referring now to FIGURE 2 of the accompanying drawings, there is illustrated a sphere 8 having a diameter equal to the major axis of the ellipse 5. The plane 2 is illustrated in this figure at the same angle with respect to the well axis 3 as the plane 2 in FIGURE 1 and there is illustrated a perpendicular 9 to the plane 2 which intercepts the surface of the sphere 8 at the point 11. The well axis 3 is also applied to FIGURE 2, intercepting the surface of the sphere 8 at point 12, and the perpendicular 9 and well axis 3 intersect with one another at the center of the sphere 8. A plane 13, drawn perpendicular to the well axis 3, is also inscribed within the sphere 8 and constitutes the apparent horizontal of the well tool 1. The angle between the plane 13 and plane 2 is the apparent dip of the interface between the two strata under consideration. The true horizontal of the system is represented by the line 14 and the vertical axis is defined by a line 16 which intercepts the surface of the sphere 8 at a point 17.

Since the apparent dip of the plane 2 is the angle between the plane 13 and plane 2, the angle between the perpendiculars 3 and 9 to these planes is also equal to the apparent dip of the plane. Therefore, a line 18 drawn between the points 11 and 12 on the surface of the sphere 8 represents, in a spherical triangle, the apparent dip of the plane 2. The angle between the well axis 3 and the vertical 16 defines the angular deviation of the well from the vertical and therefore a line 19 drawn between the points 12 and 17 has a length proportional to this angle. The direction of the line 19 on the surface of the sphere 8 is an indication of the direction of deviation of the well axis from the datum line of the well tool. The line 18 has a direction relative to the line 19 as determined by the major axis of the ellipse 5 and the angle between the lines 18 and 19 is equal to the apparent dip direction with respect to the direction of well deviation which is determinable by the information relating to the points 4, 6 and 7 provided by the well logging apparatus. If a line 21 is now drawn between the points 11 and 17, a spherical triangle is defined on the surface of the sphere 8 and since the values of two sides and the included angle of this triangle are known, all other parameters of the triangle are determinable. The two quantities which it is desired to determine are the length of the line 21 in degrees and the angle between the lines 19 and 21 also in degrees. The former quantity represents the true dip of the plane 2 with respect to the horizontal since it is the line drawn between a perpendicular to the plane 2 and a perpendicular to the horizontal plane 14; that is the vertical direction. The latter quantity is the supplement of the angle between the direction of true dip and the direction of well deviation. Since the angle between north and the well deviation is known the direction of the angle of true dip is readily determinable.

In accordance with the present invention, information relating to the well deviation, the direction of well deviation, the well diameter, the depths of the three points 4, 6 and 7 and the reading of a compass located in the tool is applied to a system of differential gears and electromechanical resolvers from which is derived the true dip of the plane 2 and the true dip direction. More specifically, and reference is now made to FIGURE 3 of the accompanying drawings, input power is applied to a primary winding 21 of the transformer 22 having a secondary winding 23. Four potentiometers 24, 25, 26 and 27 are connected in parallel with the secondary winding 23 and each of the resistors 24 through 27 is provided with a variable tap 28, 29, 20 and 31 respectively. The voltage between the slider 28 and the lower end of the resistor 24 is applied via a pair of leads 32 to a stator winding 33 of an electromechanical resolver 34 and to a stator winding 35 of an electromechaincal resolver 36. The voltages appearing at the taps 29, 30 and 31 are applied to an electromechanical resolver 37 having delta-connected stator windings 38, 39 and 41. Specifically, the voltages appearing at the sliders 29 and 30 are connected across the winding 38, the voltages appearing at the sliders 30 and 31 are connected across the stator winding 39 and the voltage appearing at the sliders 29 and 31 are connected across the stator winding 41. The resolver 37 is provided with two rotor windings 42 and 43 constructed or disposed at right angles to one another and the winding 43 is connected to a zero-centered null indicating meter 44. The meter is supplied with a reference phase voltage from the input A.C. applied to winding 21 via leads 45. The winding 42 is connected via a pair of leads 46 to a second stator winding 47 of the resolver 34 and to a rotor winding 48 of a further electromechanical resolver 49. The windings 33 and 47 of the resolver 34 are disposed at right angles to one another and the resolver further comprises two rotor windings 49 and 51 connected at right angles to one another. The winding 49 is connected to a zero-centered null indicating meter 52, which receives a reference phase voltage via leads 55 from the A.C. line voltage, while the winding 51 is connected via a pair of leads 53 to a rotor winding 54 of a further electromechanical resolver 56. The electromechanical resolver 56 is provided with two stator windings 57 and 58 disposed at right angles to one another and the winding 58 is connected to a rotor winding 59 of the resolver 36. The winding 57 of the resolver 56 is connected to a single stator winding 61 of a further resolver 62 having a rotor winding 63 connected to a first stator winding 64 of the resolver 49. The resolver 49 has a further stator winding 66 disposed at right angles to the winding 64 which is connected via lead 67 to a stator winding 68 of the resolver 36; the stator windings 35 and 68 of the resolver 36 being disposed at right angles to one another. A null indicating volt meter 69 is connected in series between the windings 58 and 59 of the resolvers 56 and 36 respectively, while a further null indicating volt meter 71 is connected between the windings 63 and 64 of the resolvers 49 and 62, respectively. Isolation amplifiers may be connected between various of the resolver windings and other elements to prevent loading the voltages generated in various windings and across various resistors. The meters 69 and 71 are preferably high impedance voltmeters, also to prevent interaction between resolver windings.

In operation, the slider 28 is positioned on the resistor 24 to provide a voltage across the leads 32 proportional to the diameter of the well. The sliders 29, 30 and 31 are positioned on their respective resistors 25, 26, and 27 each in accordance with the depth of a different one of the points 4, 6 and 7 of FIGURE 1 with respect to a datum depth. Since the windings 38, 39 and 41 are disposed at 120° with respect to one another, and the windings 38, 39 and 41, as previously indicated, are arranged in a delta connection, a field is developed having a magnitude proportional to the height of the ellipse 5 parallel to the axis of the well 3. Specifically, the height of the major axis of the ellipse 5 parallel to the axis 3 of the well, which is indicated by the quantity H in FIGURE 1, is equal to the vector sum of the three measured depth differences of the points 4, 6 and 7, and therefore the magnitude of the field generated by the delta-connected windings 38, 39 and 41 which have the same angular displacement as the points 4, 6 and 7 corresponds to the amount of dip measured parallel to the well axis while the direction of the field corresponds to the direction of the major axis relative to the datum line of the well tool. In consequence, by rotating the windings 42 and 43 so that a null is indicated by the meter 44, the winding 43 is aligned with the direction of the field thus developed and since the winding 42 is disposed at right angles to the winding 43, a voltage is developed in this winding which is directly proportional to the magnitude H. However, the phase of the voltage across winding 42 could be reversed by 180° and affect all subsequent operations. Therefore, the meter 44 is phase sensitive. Although when the rotor is properly positioned, the voltage across the winding is zero and therefore the meter 44 indicates a zero, the direction from which the needle approaches zero indicates the phase of the voltage across the winding 43 and therefore winding 42. Thus, if the needle approaches the centered zero marker from the wrong side of the scale, the proper side of approach being determined by the initial interconnection of the various elemnts, the rotor is rotated a full extra half turn to obtain the proper null.

The voltage developed across the winding 42 is applied via leads 46 to the winding 47 of the resolver 34 and a voltage proportional to the diameter of the well is applied to the winding 33 of this resolver via leads 32. If the rotor windings 49 and 51 are now rotated until the instrument 52 indicates a null, again taking into account the proper direction of approach toward null to insure proper phase, a voltage is developed in the winding 51 which is proportional to the quantity D divided by cos $b$ which is the expression for the length of the major axis of the ellipse 5. Referring specifically to FIGURE 4 of the accompanying drawings, if the quantity H is equal to the projection on the well axis 3 of the intersection of the interface between strata with the well bore, and the value D is equal to the diameter of the well bore, these two quantities being at right angles to one another, then the third side of the triangle represents the length of the major axis of the ellipse 5 and is designated as the quantity X. If the angle $b$ is taken to be the apparent dip angle, the angle between the plane 2 and the apparent horizontal, then X is equal to $$\frac{D}{\cos b}$$

Therefore, the resolver 34 solves the right triangle HDX of FIGURE 4 to provide across the leads 53 a voltage proportional to the length of the major axis of the ellipse 5. Referring to FIGURE 2, the angle $b$ is represented by the line 18 since the angle between X and D is the angle between the planes 2 and 13 or the lines perpendicular thereto.

The voltage proportional to the quantity H is also applied to the rotor 48 of the resolver 49 and the rotor is physically positioned to assume an angle with respect to the winding 64 equal to the angle between the direction of apparent dip and the direction of well deviation, this angle being designated in FIGURE 2 as the angle gamma. In consequence, a voltage is developed across the winding 66 proportional to $H$ sin gamma. However, for reasons which will become apparent subsequently, the value H is represented by the quantity $D$ tan $b$ and by referring to FIGURE 4, it becomes readily apparent that H is equal to this latter quantity. The voltage proportional to $D$ tan $b$ sin gamma is applied to the winding 68 of resolver 36 via the lead 67. The voltage developed across the other stator winding 64 of the resolver 49 is equal to $D$ tan $b$ cos gamma, the value $D$ tan $b$ again being employed for H for purposes to be described subsequently.

Referring now to the resolver 36, if the rotor 59 of the resolver 36 is now positioned in accordance with the angle of well deviation, designated by the angle $a$ in FIGURE 2, then a voltage is developed across the winding 59 equal to $D$ cos $a + D$ tan $b$ cos gamma sin $a$ which can be shown by the rules of spherical trigonometry to be equal to $$\frac{D \cos c}{\cos b}$$

where $c$ is the true dip represented by the line 21 in FIGURE 2. If now the rotor 54 of the resolver 56 is rotated until a null is indicated by the instrument 69, then it is known that the voltage developed across the winding 58 of the resolver 56 must also be equal to the voltage across rotor 59 or $$\frac{D \cos c}{\cos b}$$

The only way that the quantity $$\frac{D}{\cos b}$$

which is applied to the rotor winding 54, can be multiplied by cos $c$ is if the rotor winding 54 has been positioned at an angle with respect to the winding 58 equal to the angle $c$. Since the angle $c$ is the angle of true dip as illustrated in FIGURE 2, it is apparent therefore that the angular position of the rotor 54 with respect to the stator winding 58 is a direct reading of this quantity. The angle of the rotor 54 may readily be determined by a scale associated with the dial employed to rotate the rotor 54. One of the quantities to be determined by the present invention is therefore represented by the position of the rotor 54.

Continuing with the description of the elements necessary to obtain the direction of true dip, the voltage developed across the winding 57 of the resolver 56 is equal to $$\frac{D \cos c}{\sin b}$$

and this voltage is applied to the winding 61 of the resolver 62. By the rules of spherical trigonometry, if the quantity $$\frac{D \sin c}{\cos b}$$

is multiplied by the quantity sin beta, the product is equal to $D \tan b \cos \gamma$. This quantity already appears across the winding 64 of the resolver 49 and therefore, by rotating the rotor 63 of the resolver 62 until the meter 71 indicates a null, the angle beta has been inserted into the equation via the positioning of the rotor 63. The angle beta is the angle between the lines 19 and 21 and is equal to the supplement of the angle between the direction of true dip and the direction of well deviation. Since an angle and its supplement are related by 180°, the true angle, rather than its supplement beta, is obtained by merely reversing the connections to the ends of the winding 63. Since the direction of well deviation is known, having been determined during the well logging operation, the direction of true dip is obtainable and the problem is now completed.

It will be noted that all settings of the electromechanical resolvers are determined by rotating the rotors until associated indicators indicate a null condition. Since, in the sections of the apparatus where phase inversions may occur, phase sensitive null indicators are employed, it is possible to avoid the introduction of a 180° vectorial error into the system which might occur if other types of instruments were employed. Further, the quantity H may be introduced directly as a voltage rather than employing the resolver 37 as a part of the apparatus of the present invention; that is, the information relating to the three points 4, 6 and 7 of FIGURE 1 may be resolved exteriorly or separately from the present instrument and the quantity thus obtained applied to the instrument of the present invention as a distinct input function. The quantity H may also be derived from a more conventional resolver having only two stator windings disposed at 90° relative to each other. In such a case, a first voltage equal to $(d_1-d_2)+\frac{1}{2}(d_2-d_3)$ is applied to one winding and a second voltage equal to $0.866(d_2-d_3)$ is applied to the other winding. Deriving the quantity H in this manner permits the utilization of readily available resolvers while the previously described method requires the use of an expensive and not readily available instrument.

The angle gamma; that is, the angle of apparent dip direction with respect to well deviation, may also be derived separately from the apparatus of the present invention, or may be derived internally of the machine by a mechanical mechanism constituting part of the input mechanical arrangement. Such an arrangement is illustrated in FIGURE 5 of the accompanying drawings which is a schematic representation of the mechanical connection between input control dials and the various elements of the apparatus illustrated in FIGURE 3.

Referring now specifically to FIGURE 5 of the accompanying drawings, there is provided a dial 72 connected via an appropriate shaft 73 to the slider 28 which is variably positionable upon the resistor 24. The dial 72 therefore is employed to insert the reading proportional to well diameter. A dial 74 is connected via a shaft 76 to the rotor 59 of the resolver 36 in order to insert into the machine the angle of well deviation from vertical; that is, the quantity $a$, or side 19 in FIGURE 2 of the accompanying drawings. The quantities proportional to the depth of the points 4, 6 and 7 from a datum plane are inserted by dials 77, 78 and 79 respectively which are coupled to the sliders 29, 30 and 31 via shafts 81, 82, and 83.

In order to insert into the machine the angle gamma, there is provided a dial 84 which is positioned in accordance with the direction of well deviation. The dial 84 is connected via a shaft 86 to a differential gear mechanism 87 and constitutes an input shaft thereto while a second input shaft 88 of the mechanism 87 is coupled to the rotors 43 and 42 of the resolver 37. The rotor of resolver 37 is rotated by means of a knob 89 in order to produce a null in the meter 44 and since the rotor winding 43 is positioned parallel to the vectorial resultant representative of the quantity H the position of the rotor represents the direction of the major axis of the ellipse 2A and the shaft 88 applies this direction to the gear 87. In consequence, the direction of well deviation and direction of apparent dip are fed to the differential gear 87 and an output shaft 91 is rotated in accordance with the angle between these two quantities; that is, the quantity gamma. The shaft 91 is coupled to the rotor of the resolver 49 and therefore, the angle gamma is inserted into this resolver.

It must be remembered that the direction of well deviation is taken with respect to the datum line of the well logging instrument and in order to orient the system with respect to true north, the compass reading and the magnetic declination must be inserted into the apparatus. The dials 92 and 93 respectively are employed for this purpose. The dials 92 and 93 are coupled via shafts 94 and 96 respectively to differential gear 97 having an output shaft 98 rotated in accordance with true north. This shaft is coupled as one input to a differential gear mechanism 99, the other input 101 of which is supplied by shaft 101 which is coupled to the rotor winding 63 of resolver 62. The rotor 63 is rotated by a knob 100 until a null is obtained on the meter 71 at which time the rotor 63 lies at an angle corresponding to the angle between direction of true dip and the direction of well deviation. Therefore, the shaft 101 is rotated in accordance with this angle. The differential gear 99 now has applied thereto the angle between the direction of the true dip and the direction of well deviation via shaft 101 and via the shaft 98 the angle between the direction of well deviation and true north. Consequently, the output shaft 106 of the differential gear 99 is positioned in accordance with the direction of the true dip relative to true north. The shaft 106 positions a dial 107 that now indicates the aforesaid angle which is one of the quantities to be determined by the apparatus of the present invention. Obviously, if it were not desired to insert a magnetic declination correction into the apparatus the dial 93 and differential gear 97 may be eliminated.

The second quantity to be determined by the apparatus is the amount of the true dip and this is read on a dial 105 driven via a shaft 104 from the rotor of the resolver 56. Finishing the description of the mechanical arrangement, the rotors 49 and 51 of the resolver 34 are rotated by a knob 108 via a shaft 109. For precise determination of the true dip direction, the dial 92 in FIGURE 5 must be set to the corrected angle between the direction of well deviation from vertical and the direction of the needle of the compass in order to properly position the shaft 94. The term "corrected" refers to correction of an error in reading angles relative to magnetic north when the well and consequently the tool deviate from the vertical. This error arises with certain tools in which the compass is mounted in gimbals so as to remain in a horizontal position whereas the mechanism for reading the compass is secured to the tool and is often tilted from the vertical. If, for example, the position of the needle on the compass is read by a photo-system in which the compass needle carries a mirror while a rotating beam of light, having the axis of the instrument at its center of rotation, is employed to measure the angle of the needle of the compass, the angle at which the light beam intersects the needle mirror varies from its true value when the plane perpendicular to the axis of the well tool is at an angle with respect to the horizontal plane in which the compass lies. Actually, no variation in angle is effected if the compass needle lies in the plane of the well axis and the vertical or 90° with respect thereto, since the scan of the beam, relative to horizontal, is elliptical and it is known that no change of angle is effected under the aforesaid conditions which correspond to the major and minor axis of the ellipse. However, if the needle lies at any other angle than along one of the axes of the ellipse, the angle read varies with the angle of the needle relative to the axes of the ellipse; the greatest deviation being effected when the needle lies at 45° with respect to the plane of the well axis and the vertical. The relationship between the corrected angle of the compass, the angle thereof as measured in the aforementioned way, and the angular amount of deviation of the tool from vertical follows a known geometric law. Specifically, the tangent of the corrected angle is equal to the tangent of the angle as read from the tool divided by the cosine of the angle of deviation from vertical. This geometric relationship is precisely the same as that followed by a universal joint of the crossed-pivot type. Accordingly, a joint of this type may be employed between the dial 92 and the shaft 94 to perform the desired correction of the rotation of the shaft 94.

Referring now specifically to FIGURE 6 of the accompanying drawings there is provided on shaft 76 a first miter gear 76a which cooperates with a second miter gear 76b to produce a rotation of the shaft 76c which is equal to that of the shaft 76. The shaft 76c carries at its opposite extremity a yoke 76d through which passes a shaft 94a directly coupled to the dial 92. The shaft 94a is coupled through a universal joint 94b to the shaft 94. Accordingly, when the dial 74 is positioned to correspond with the amount of deviation of the tool from vertical the universal joint 94b is bent a corresponding amount. Under this circumstance, the universal joint, by virtue of its crossed-pivot construction and by having its pivots properly oriented with respect to the markings of the dial 92, introduces exactly the amount of additional rotation of shaft 94 beyond that caused by setting the dial 92 needed to compensate for the tilted scanning of the compass. Accordingly, when the arrangement shown in FIGURE 6 is used, the dial 92 may be set to the uncorrected compass angle as read from the well tool.

While I have described and illustrated one specific embodiment of my invention, it will be clear that variations of the details of construction which are specifically illustrated and described may be resorted to without departing from the true spirit and scope of the invention as defined in the appended claims. For example, it is not necessary to connect all three of the delta-connected stator windings 38, 39 and 41 in the electromechanical resolver 37. Energizing any two of the three windings will produce a magnetic field in the same direction and exactly half as strong as would be produced by energizing all three windings. The reduction in strength may be compensated for by doubling the number of turns in the rotor winding 42 or by doubling the voltage applied to the resistors 24, 25 and 26 or by reducing to half the voltage at slider 28. Likewise, since the voltages applied to the stator or resolver 37 each represent a depth difference, it is not necessary to provide adjustable sliders on all three of the resistors 25, 26 and 27. One depth may be taken as a reference and the other two measured with respect to it. Thus one of the three resistors, say resistor 25, may have a fixed setting, in which case the slider on each of the two remaining resistors is positioned in accordance with the depth of the intersection of the interface and well bore at points corresponding with these remaining resistors, which depths are measured with respect to said reference depth. Preferably resistor 25 is center-tapped to provide equal positive and negative ranges of depth measurement for the remaining two.

What I claim is:

1. An electric apparatus for computing the true dip and direction of dip of an interface between strata intersecting a well bore, comprising input means for applying to said apparatus a first and a plurality of second electrical quantities respectively proportional to the diameter of the well bore, and the vertical heights from a datum depth of three points of intersection of the interface and the well bore measured at three locations spaced about the well wall, means for vectorially combining said second electrical quantities to produce a third electrical quantity proportional to the height of the projection of the interface along the well bore axis, means for vectorially combining said first and third electrical quantities to generate a fourth electrical quantity proportional to the height of the projection of the interface along the well bore axis, means for producing fifth and sixth electrical quantities which are proportional to the product of said third electrical quantity and first and second functions, respectively, of the angle between the direction of well deviation and the direction of apparent dip, means for producing a seventh electrical quantity proportional to the sum of the product of the first electrical quantity and a function of the angle of well deviation, and the product of the said fifth electrical quantity and a different function of said angle of well deviation, electromechanical means for varying the said fourth electrical quantity to equal said seventh electrical quantity, means for measuring the mechanical movement of said electromechanical means as an indication of the true dip of said stratum, said electromechanical means also producing an eighth electrical quantity proportional to the product of said fourth electrical quantity and a function of the true dip, second electromechanical means for varying said eighth quantity to equal said sixth quantity and means for measuring the mechanical movement of said second electromechanical device as an indication of the direction of the true dip.

2. An electric apparatus for computing the true dip and direction of dip of an interface between strata intersecting a well bore, comprising input means for applying to said apparatus a first and a plurality of second electrical quantities respectively proportional to the diameter of the well bore, and the vertical heights from a datum depth of three points of intersection of the interface and the well bore measured at three locations spaced about the well bore wall, a first shaft, a first electromechanical means for vectorially combining said second electrical quantities to produce a third electrical quantity proportional to the height of the projection of the stratum intersecting said bore hole along the bore hole axis and to rotate said first shaft to a position indicative of the direction of dip relative to datum line, means for vectorially combining said first and third electrical quantities to generate a fourth electrical quantity proportional to the maximum length of the interface intersected by the well, a second shaft, means for positioning said second shaft in accordance with the direction of well deviation with respect to said datum line, a third shaft, means for combining the rotations of said first and second shafts to position said third shaft in accordance with the angle between the direction of apparent dip and the direction of well deviation, a second electromechanical means, means for applying said third rotation to said second electromechanical means, means for applying said third electrical quantity to said second electromechanical means for producing fifth and sixth electrical quantities proportional to the product of said third electrical quantity and the product of first and second functions respectively of the angle between the directions of apparent dip and well deviation, means for producing a seventh electrical quantity proportional to the sum of the product of the first electrical quantity and a function of the angle of well deviation and the product of the said fifth electrical quantity and a different function of said angle of well deviation, third electromechanical means for varying the said fourth electrical quantity to equal said seventh electrical quantity, means for measuring the mechanical movement of said third electromechanical means as an indication of the true dip of said stratum, said third electromechanical means also producing an eighth electrical quantity proportional to the product of said fourth electrical quantity and a function of the true dip, fourth electromechanical means for varying said eighth quantity to equal said sixth quantity and means for measuring the mechanical movement of said fourth electromechanical device as an indication of the direction of the true dip.

3. The combination according to claim 1 wherein said mechanical movement of said electromechanical device is directly proportional to the angle between the direction of well deviation and the direction of true dip, and mechanical means for deriving the direction of true dip from said last mentioned means, said mechanical means including means for applying thereto the direction of well deviation and the direction of north relative to a datum line.

4. The combination according to claim 1 wherein said mechanical movement of said electromechanical device is directly proportional to the angle between the direction of well deviation and the direction of true dip, and mechanical means for deriving the direction of true dip from said last mentioned means, said mechanical means including means for applying thereto the direction of well deviation with respect to a datum line and the direction of north with respect to the direction of well deviation.

References Cited in the file of this patent

FOREIGN PATENTS 1,210,022   France _____ Sept. 28, 1959